US010035326B2

(12) United States Patent
Le Gall et al.

(10) Patent No.: US 10,035,326 B2
(45) Date of Patent: *Jul. 31, 2018

(54) COMPOSITE MATERIALS

(71) Applicant: Zephyros, Inc., Romeo, MI (US)

(72) Inventors: Eric Le Gall, Strasbourg (FR); Frederic Ostrowsky, Illkirch Graffenstaden (FR); Denis Souvay, Illkirch Graffenstaden (FR)

(73) Assignee: Zephyros, Inc., Romeo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/943,981

(22) Filed: Nov. 17, 2015

(65) Prior Publication Data
US 2016/0151998 A1 Jun. 2, 2016

Related U.S. Application Data

(63) Continuation of application No. 13/613,102, filed on Sep. 13, 2012, now Pat. No. 9,186,864, which is a
(Continued)

(30) Foreign Application Priority Data

Feb. 2, 2004 (GB) .................................. 0402221.6

(51) Int. Cl.
*B32B 5/18* (2006.01)
*B32B 15/20* (2006.01)
(Continued)

(52) U.S. Cl.
CPC ............ *B32B 5/18* (2013.01); *B29C 44/1228* (2013.01); *B32B 1/08* (2013.01); *B32B 5/245* (2013.01);
(Continued)

(58) Field of Classification Search
CPC .......... B32B 2305/022; B32B 2363/00; B32B 2038/0084; B32B 2250/40;
(Continued)

(56) References Cited

U.S. PATENT DOCUMENTS 3,598,671 A 8/1971 Wortman
3,686,047 A 8/1972 Miller
(Continued)

FOREIGN PATENT DOCUMENTS

DE 90 11 147.8 9/1990
DE 93 20 333.0 5/1993
(Continued)

OTHER PUBLICATIONS

Hopton et al,, Application of a Structural Reinforcing Material to Improve Vehicle NVH Characteristics, (1999).
(Continued)

*Primary Examiner* — Camie S Thompson
(74) *Attorney, Agent, or Firm* — The Dobrusin Law Firm, P.C.

(57) ABSTRACT

Light weight composites with high flexural strength comprise epoxy foam sandwiched between two layers of facing material have high strength and low weight and can be used to replace steel structures. The facing layer may be fibrous material especially glass or carbon fibers, the facing material is preferably embedded into the epoxy matrix. Alternatively they may be matching box structures or concentric metal tubes. The sandwich structures may be prepared by laying up the fiber; coating and/or impregnating the layer with epoxy resin, laying a layer of heat activatable foamable epoxy material, providing a further layer of the fibrous material optionally coated and/or impregnated with epoxy resin on the foamable material and heating to foam and cure the epoxy materials. Alternatively they may be formed by
(Continued)

extrusion of the foamable material between the surface layers.

20 Claims, 5 Drawing Sheets

Related U.S. Application Data continuation of application No. 10/597,610, filed as application No. PCT/EP2005/001056 on Feb. 1, 2005, now Pat. No. 8,334,055.

(51) Int. Cl.
| | |
|---|---|
| *B32B 15/18* | (2006.01) |
| *B32B 1/08* | (2006.01) |
| *B32B 5/24* | (2006.01) |
| *B32B 15/04* | (2006.01) |
| *B32B 27/06* | (2006.01) |
| *E04C 2/296* | (2006.01) |
| *B29C 44/12* | (2006.01) |
| *B32B 38/00* | (2006.01) |

(52) U.S. Cl.
CPC ............ *B32B 15/046* (2013.01); *B32B 15/18* (2013.01); *B32B 15/20* (2013.01); *B32B 27/065* (2013.01); *E04C 2/296* (2013.01); *B29C 44/1209* (2013.01); *B32B 2038/0084* (2013.01); *B32B 2250/03* (2013.01); *B32B 2250/40* (2013.01); *B32B 2266/0271* (2013.01); *B32B 2305/022* (2013.01); *B32B 2307/558* (2013.01); *B32B 2307/718* (2013.01); *B32B 2363/00* (2013.01); *B32B 2597/00* (2013.01); *B32B 2607/00* (2013.01); *Y10T 428/12535* (2015.01); *Y10T 428/2495* (2015.01); *Y10T 428/24967* (2015.01); *Y10T 428/249924* (2015.04); *Y10T 428/249953* (2015.04); *Y10T 428/249971* (2015.04); *Y10T 428/249986* (2015.04); *Y10T 428/249987* (2015.04)

(58) Field of Classification Search
CPC ..... B32B 2250/03; B32B 5/18; B32B 15/026; B32B 27/065; E04C 2/296; Y10T 428/249953; Y10T 428/249986; B29C 44/1228
USPC ....... 156/77; 428/304.4, 313.3, 317.9, 318.4, 428/213
See application file for complete search history.

(56) References Cited

U.S. PATENT DOCUMENTS

| | | | |
|---|---|---|---|
| 3,649,375 A | 10/1972 | Venkatesan | |
| 3,792,141 A | 2/1974 | Offutt | |
| 3,868,796 A | 3/1975 | Bush | |
| 3,941,725 A | 3/1976 | Schmitter et al. | |
| 4,065,150 A | 12/1977 | Van Auken | |
| 4,316,934 A | 2/1982 | Maier et al. | |
| 4,399,174 A | 8/1983 | Tanaka et al. | |
| 4,476,183 A | 10/1984 | Holtrop et al. | |
| 4,572,865 A * | 2/1986 | Gluck ................ | B29C 44/1209 428/309.9 |
| 4,581,186 A | 4/1986 | Larson | |
| 4,707,397 A | 11/1987 | Morimura et al. | |
| 4,784,902 A | 11/1988 | Crompton | |
| 4,803,105 A | 2/1989 | Kretow et al. | |
| 4,922,596 A | 5/1990 | Wycech | |
| 4,968,545 A * | 11/1990 | Fellman ................... | B32B 5/24 138/124 |
| 4,978,562 A | 12/1990 | Wycech | |
| 5,030,488 A | 7/1991 | Sobolev | |
| 5,124,186 A | 6/1992 | Wycech | |
| 5,474,721 A | 12/1995 | Stevens | |
| 5,707,098 A | 1/1998 | Uchida | |
| 5,849,407 A | 12/1998 | Seibert | |
| 5,858,521 A | 1/1999 | Okuda et al. | |
| 5,884,960 A | 3/1999 | Wycech | |
| 5,892,187 A | 4/1999 | Patrick | |
| 5,902,656 A | 5/1999 | Hwang | |
| 5,985,435 A | 11/1999 | Czaplicki et al. | |
| 6,139,094 A | 10/2000 | Teply et al. | |
| 6,253,819 B1 | 7/2001 | Frendle et al. | |
| 6,309,985 B1 | 10/2001 | Virnelson et al. | |
| 6,372,334 B1 | 4/2002 | Wycech | |
| H2047 H | 9/2002 | Harrison et al. | |
| 6,444,713 B1 | 9/2002 | Pachl et al. | |
| 6,454,974 B1 | 9/2002 | Wilson | |
| 6,455,146 B1 | 9/2002 | Fitzgerald | |
| 6,482,496 B1 | 11/2002 | Wycech | |
| 6,607,831 B2 | 8/2003 | Ho et al. | |
| 6,790,520 B1 | 9/2004 | Todd et al. | |
| 6,828,020 B2 | 12/2004 | Fisher et al. | |
| 6,855,652 B2 | 2/2005 | Hable et al. | |
| 7,141,194 B1 | 11/2006 | Beckmann | |
| 8,334,055 B2 * | 12/2012 | Le Gall ............... | B29C 44/1228 428/292.1 |
| 9,186,864 B2 * | 11/2015 | Le Gall ............... | B29C 44/1228 |
| 2001/0022407 A1 | 12/2001 | Beckmann | |
| 2002/0066254 A1 | 6/2002 | Ebbinghaus | |
| 2003/0039792 A1 | 2/2003 | Hable et al. | |
| 2003/0176128 A1 | 9/2003 | Czaplicki et al. | |
| 2003/0183317 A1 | 10/2003 | Czaplicki et al. | |
| 2004/0076831 A1 | 4/2004 | Hable et al. | |
| 2004/0084141 A1 | 5/2004 | Czaplicki | |
| 2004/0195817 A1 | 10/2004 | Tarbutton et al. | |
| 2005/0102815 A1 | 5/2005 | Larsen | |
| 2005/0126848 A1 | 6/2005 | Siavoshai | |
| 2005/0166532 A1 | 8/2005 | Barz | |
| 2005/0172486 A1 | 8/2005 | Carlson et al. | |
| 2006/0000186 A1 | 1/2006 | Carlson et al. | |

FOREIGN PATENT DOCUMENTS

| | | |
|---|---|---|
| DE | 42 26 988 A1 | 2/1994 |
| DE | 4226988 | 2/1994 |
| EP | 0 047 229 | 8/1981 |
| EP | 0 061 131 | 9/1982 |
| EP | 0 253 221 | 1/1988 |
| EP | 0 360 214 A2 | 3/1990 |
| EP | 0 679 501 | 11/1995 |
| EP | 0 697 956 B1 | 2/1996 |
| EP | 0 819 723 A1 | 1/1998 |
| EP | 1 046 666 A1 | 10/2000 |
| EP | 1 072 647 A2 | 1/2001 |
| EP | 1 182 087 | 2/2002 |
| EP | 0 703 931 B1 | 10/2003 |
| EP | 1 366 960 A1 | 12/2003 |
| EP | 1 134 314 B1 | 9/2004 |
| EP | 1 471 105 | 10/2004 |
| EP | 1 299 497 | 12/2004 |
| EP | 1 351 787 B1 | 3/2005 |
| EP | 1 577 190 | 9/2005 |
| EP | 1 127 669 | 4/2006 |
| FR | 2 356 509 | 6/1977 |
| GB | 2 061 196 | 5/1981 |
| JP | 58049223 | 3/1983 |
| JP | 02 206 537 | 8/1990 |
| JP | 5-38992 | 2/1993 |
| JP | 10-286836 | 10/1998 |
| JP | 2963070 | 10/1998 |
| WO | WO89/06595 | 7/1989 |
| WO | WO99/08854 | 2/1999 |
| WO | WO99/50057 | 10/1999 |
| WO | WO99/61281 | 12/1999 |
| WO | WO00/10802 | 3/2000 |
| WO | WO00/38863 | 7/2000 |
| WO | WO00/46461 | 8/2000 |
| WO | WO01/10682 | 2/2001 |

(56) References Cited

FOREIGN PATENT DOCUMENTS

| WO | WO04/067304 | 8/2004 |
|---|---|---|
| WO | WO05/044630 | 5/2005 |
| WO | WO05/080524 | 9/2005 |
| WO | WO05/118735 | 12/2005 |

OTHER PUBLICATIONS

Lilley et al., A Comparison of NVH Treatments for Vehicle Floorplan Applications. (2001).
Copending U.S. Appl. No. 10/718,509, filed Nov. 20, 2003.
Copending Patent Application Serial No. GB 0220945.0 filed Sep. 10, 2002.
Copending Patent Application Serial No. EP 0300159.1 filed Jan. 6, 2003.
Copending U.S. Appl. No. 11/188,679, filed Jul. 25, 2005.
Copending U.S. Appl. No. 11/189,190, filed Jul. 26, 2005.
Copending U.S. Appl. No. 11/254,129, filed Oct. 19, 2005.
Copending U.S. Appl. No. 60/753,973, filed Dec. 23, 2005.
Copending U.S. Appl. No. 11/339,431, filed Jan. 25, 2006.
Copending U.S. Appl. No. 11/390,658, filed Mar. 28, 2006.
Copending U.S. Appl. No. 11/391,884, filed Mar. 29, 2006.
Copending U.S. Appl. No. 11/393,535, filed Mar. 30, 2006.
Copending U.S. Appl. No. 11/393,431, filed Mar. 30, 2006.
Copending U.S. Appl. No. 11/401,207, filed Apr. 10, 2006.
Copending U.S. Appl. No. 11/381,769, filed May 5, 2006.
Copending U.S. Appl. No. 60/746,810, filed May 9, 2006.
Copending U.S. Appl. No. 60/747,677, filed May 19, 2006.
Copending U.S. Appl. No. 60/804,117, filed Jun. 7, 2006.
Copending U.S. Appl. No. 11/422,705, filed Jun. 7, 2006.
Copending U.S. Appl. No. 60/820,295, filed Jul. 25, 2006.
Oshima et al., Expandable Epoxy Resin Compositions and Manufacture of Their Intermediate Moldings and Cellular composite Materials. Patent No. JP 04266940 Sep. 22, 1992. (Abstract)
Yamamoto et al., Intermediates for Lightweight Fiber-Reinforced Composites with Porous Core and Their Manufacture. Patent No. JP 04158026 Jun. 1, 1992. (Abstract).
Kagoshima et al., Foamable Epoxy Resin Compositions, Patent No. EP 500009 Aug. 26, 1992, (Abstract).
Adachi Shin Sanyo KK, Foamed Seals, Patent No. JP 59133280 Jul. 31, 1984, (Abstract).
Aisin Seiki Co., Ltd., Foamed Epoxy Resin-Metal Sandwich Panels, Patent No. JP 58049223 Mar. 23, 1983. (Abstract).
Sato et al., Porous Epoxy Resin Materials, Patent No. JP 45016588 Jun. 9, 1960. (Abstract).
Farbwerke Hoechst A. G., Epoxy Resin Foams, Patent No. FR 2009512 Feb. 6, 1970. (Abstract).
Kyo et al., Study on Isothermic Sampling from the Deep Sea (Part 1) Thermal Insulation Characteristics of Composite Materials Effective Under High Hydrostatic Pressure. Sen'i Gakkaishi 1994. (Abstract).
Invitation to Pay Additional Fees dated Jun. 10, 2005. PCT/EP2005/001056.
International Search Report and Written Opinion dated Sep. 23, 2005, PCT/EP2005/001056.
UK Search Report dated Jun. 30, 2004, Application No. GB0402221.6.
Venkatraman, Investigations on the Role of Foam Layers in the Failure of Glass-Epoxy Composite Subjected to Repeated Impacts, Journal of Reinforced Plastics and Composites(1998), 17(8), 741-751. (Abstracted.
Venkatraman, Impact Studies in Glass Epoxy Laminates Containing Foam, Journal of Reinforced Plastic and Composites (1997), 16(7), 618-630, (Abstract).
Krzysztof et al., Fatigue Behavior of Composites with Foamed Matrix, Journal of Reinforced Plastic and Composites (1994), 13(12), 1116-34. (Abstract).
Burton et al., Use of Foamed-in-Place Epoxy Resins in Aircraft Composite Structures, Journal of Cellular Plastics (1971), 7(3), 140-5, (Abstract).
Rogers Corp, USA, Epoxy Foam, U.S. Pat. No. 4,546,118 Oct. 8, 1985 (Abstract).

* cited by examiner

Sheet version (a) = steel tube
(b) = aluminium tube
(c) = composite of invention

COMPOSITE MATERIALS

TECHNICAL FIELD

The present invention relates to improved laminar composite structures and to a process for their manufacture. In particular the present invention relates to high strength light weight, rigid, composite materials and to their manufacture. The invention further relates to the production of high strength, light weight articles from such composites.

BACKGROUND OF THE INVENTION

Steel is typically used in structures where high strength is required. However steel tends to be heavy and thus adds excess weight to the article. Although there are a few light weight materials which are stronger than steel they are extremely expensive.

SUMMARY OF THE INVENTION

Accordingly, there is provided a composite and a process of forming a composite. The composite typically comprises a sandwich structure comprising at least two surface layers attached to a central layer of rigid epoxy foam wherein the layer of epoxy foam is at least 1.5 times the combined thickness of the two surface layers and the foam has a density of from 0.2 to 1.5 gram/cc. In a preferred embodiment, the surface layers are of metal foil such as aluminium or steel foil, plastic film or sheeting such as polypropylene or polyethylene film or polyethylene terephthalate film. The surface layers can be porous, fibrous or both.

BRIEF DESCRIPTION OF THE DRAWINGS

The present invention is illustrated by the accompanying FIGS. 1 to 13 in which.

DETAILED DESCRIPTION OF THE INVENTION

Figure 1:
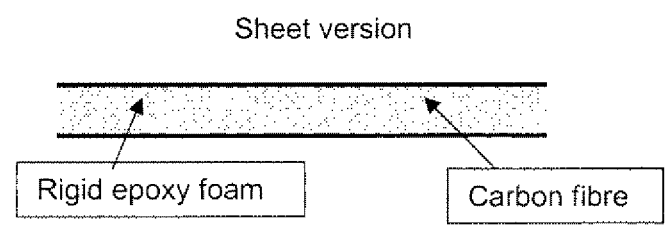
FIG. 1 shows a sheet composite according to the present invention.
Figure 2:
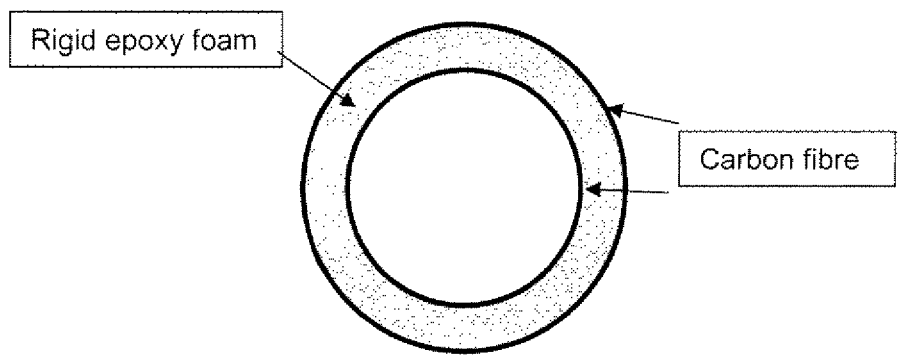
FIG. 2 shows a tube according to the present invention.
Figure 3:
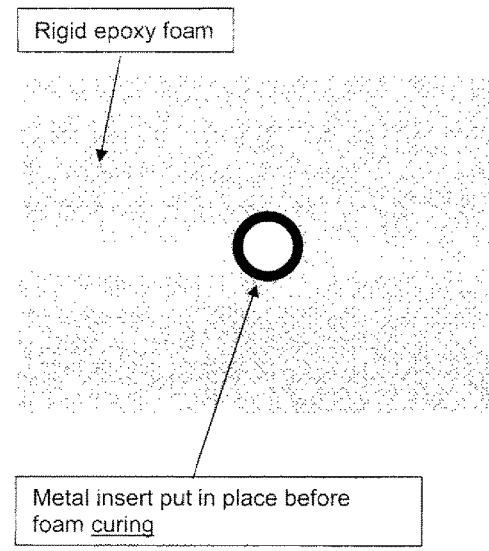
FIG. 3 shows an embodiment in which a metal insert has been positioned in the foamable material before foaming.

We have found that the light weight, rigid composites of the present invention are particularly useful as materials in the transportation industries such as in automotive, aircraft and shipping industries where they may be used to replace metal and glass reinforced plastic articles such as panels and reinforcements. In recent years there has been a trend to replace traditional steel components with lighter materials of comparable strength such as aluminium, fibre reinforced polymeric materials, foam materials and composites particularly composites containing foamed layers. There is however a continuing need for materials of increased strength and reduced weight.

The composites of the present invention have a wide variety of uses in additional applications in which high strength combined with light weight is required and in particular it can provide an inexpensive light weight material with comparable or improved strength relative to steel. The composites are particularly useful in applications in which steel has been used such as metal tubing, metal structures employed in construction and all forms of transportation. In addition, the structures can be used to improve the strength of articles in which lighter materials such as aluminium are used. Other uses include as raw materials in the production of sporting goods such as skis and in line skates and in the production of furniture.

The strength required of a material will depend upon the use to which it is to be put. For example the important characteristics can be high tensile strength and high flexural modules as measured by ASTM D790/ISO 178 norm or alternatively it can be resistance to impact, compression strength or torsional strength and in certain uses a combination of these properties may be required.

We have found that particularly desirable properties and in particularly the combination of low weight and high strength and stiffness can be obtained from composites sandwich structures consisting of at least two surface layers enclosing a layer of rigid epoxy foam.

Composite sandwich structures with a foam core are known and have been proposed as materials having significant strength and stiffness together with an advantage derived from weight considerations. For example the abstract of Japanese Patent publication JP 56049223 A2 discloses sandwich structures comprising epoxy foam sandwiched between two metal plates. Two articles by S. Vankatraman and Kishore, the first in the Journal of Reinforced Plastics and Composites Vol 16 No, 7/1997 and the second in the Journal of Reinforced Plastics and Composites Vol 17 No. 8/1998 disclose composites comprising a thin layer of flexible foam sandwiched between two thick layers of glass-epoxy resin materials. The first of these articles relates to impact studies on the glass/epoxy laminates and the second to Investigations on the role of foam layers in the Failure of Glass-Epoxy composite subjected to repeated impacts. In both articles the layer of flexible epoxy foam is provided as a prefoamed flexible layer and is adhered to the glass/epoxy layer by means of an adhesive. The later article concludes that the way the sheet layers of flexible foam are arranged with respect to the direction of impact influences the spread of the crack path on repeated impact.

U.S. Pat. No. 3,598,671 discloses a method of preparing foam plastic laminated structures in which at least one component of a foam forming material is applied as a coating onto the surface of one sheet of a base material. A further component of the foam forming material is applied as a coating onto the surface of a second sheet of the base material. The sheets are then brought together so that the components of the foam forming materials are brought together so that they foam and produce a foamed core plastic laminated structure. Example 2 of U.S. Pat. No. 3,598,671 produces such a laminate comprising a layer of epoxy foam ¼ inch thick sandwiched between two layers of fiberglass each approximately ⅛ inch thick. Accordingly the combined thickness of the two layers of fiberglass is substantially the same as the thickness of the foam. The foam is also extremely heavy, having a density of 7.5 lbs per square foot.

U.S. Pat. No. 3,598,871 does not therefore envisage the high strength light weight materials of the present invention.

Heat activatable foamable epoxy materials are known and are used in the production of structural reinforcement in automobiles. For instance the foamable material may be applied to the surface of a metal or plastic carrier to produce a component which is inserted into a part of the vehicle structure which requires reinforcement. The heat activatable foamable epoxy material may be formulated so that it will foam under the conditions that prevail in the electrocoat (e-coat) process used to provide an anticorrosion coating to the metal surfaces of the vehicle structure or in any other painting operations. Such foamable epoxy materials and their uses are described in U.S. Pat. Nos. 4,922,596; 4,978,562; 6,124,186 and 5,884,960. We have now found that improved light weight high strength composite materials can be obtained from foamable epoxy materials of this type. U.S. patent application Ser. No. 09/939,152 discloses structurally reinforced panels comprising a metal panel, a woven roving and bonded to one side of a matrix material which may be an epoxy foam.

The present invention therefore provides a composite comprising a sandwich structure comprising at least two surface layers attached to a central layer of rigid epoxy foam wherein the layer of epoxy foam is at least 1.5 times the combined thickness of the two surface layers and the foam has a density of from 0.2 to 1.5 gram/cc preferably between 0.4 and 1.5 gram/cc. In particular we prefer that the foam have a density of 0.3 to 0.6 gram/cc.

In a further embodiment the invention provides a composite comprising at least two surface layers each layer having a thickness of from 0.2 to 10 millimeters and a core layer of a rigid epoxy foam having a thickness of from 2 to 200 millimeters.

In a further embodiment of the present invention the composites of the present invention have a density in the range of from 0.1 to 2.0 gram/cc preferably 0.1 to 1.0 gram/cc; the density depending on the nature of the material used for the surface layers. In yet a further embodiment a composite of the present invention which is from 5 to 8 millimeters thick has a flexural modulus of from 100 mPa to 700 mPa preferably 200 mPa more preferably 200 mPa to 700 mPa as measured by ASTM D 790/ISO 178 norm.

The preferred surface layers of the composites of the present invention may be of any suitable material. Examples of suitable material include metal, including metal foil such as aluminium or steel foil, plastic film or sheeting such as polypropylene or polyethylene film or polyethylene terephthalate film. It is preferred however that the material be a fibrous material. It is particularly preferred that the surface layers be porous so that the epoxy material can penetrate the pores in the surface layers so that the surface layers become embedded in the epoxy foam. The invention is particularly useful in the production of light weight composite materials of hollow cross section such as tubing or box structures and here the surfaces may for example be concentric tubes or matching box sections of plastic or metal, aluminium being preferred. The surface layers may be the same or different and in some embodiments the layers may be selected to provide desired properties for example in a composite hollow section such as a tube the outer layer may be of a metal such as aluminium to provide shock resistance and the inner layer a tube such as carbon fibre to provide strength.

Where fibrous material is used it may be of any suitable material and its selection will depend upon the use to which the composite material is to be put. Examples of fibrous materials that may be used include woven and non woven textile webs such as webs derived from polyester, polyamide, polyolefin, paper, carbon and kevlar fibre. These webs may be woven or obtained by non woven web manufacturing techniques such as needle punching and point bonding. Metallic fibrous webs may also be used although we prefer to use glass fibre which may also be woven or non-woven. In particular we prefer to use glass fibre web having a weight of from 40 gram/sq meter to 400 gram/sq meter. Other preferred fibrous materials include carbon fibre and Kevlar. The surface layers may themselves be produced by the laying up of two or more layers of material which may be the same or different.

Figure 4:
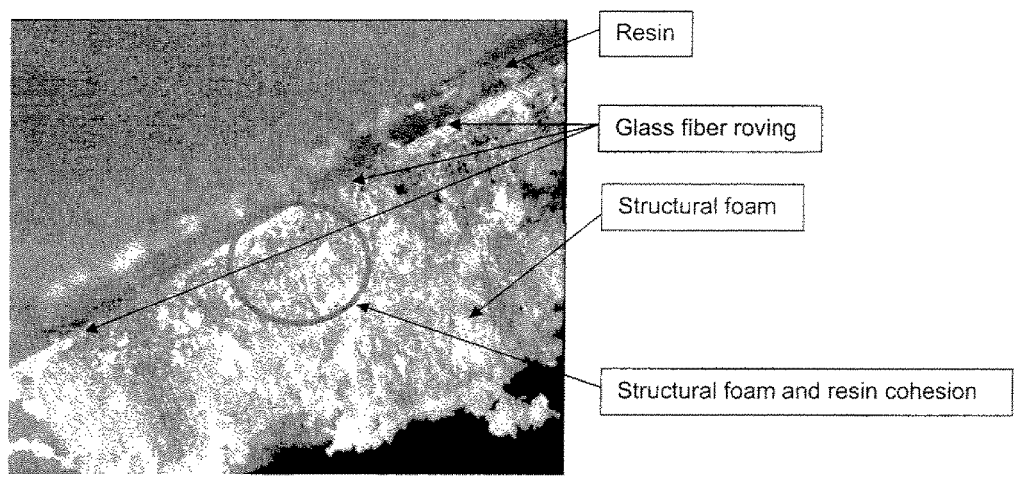
FIG. 4 is a photomicrograph of a cross section of one external surface of the composite produced according to the following Example.

The term embedded is used to describe a composite in which the surface layer, although at the surfaces of the composite is largely enveloped by epoxy material. This may be determined from electron micrograph photographs of a cross section of the material such as FIG. 4, which shows a substantially continuous layer of epoxy material extending into and at times through the surface layer. It will be appreciated that in order to be embedded it is not essential that all of the surface material be encased with the epoxy material. The epoxy material that extends into and sometimes through the surface layer may be the same as the epoxy foam although in a preferred embodiment of the present invention it is a separate unfoamed epoxy material that is compatible with the foamable epoxy material and forms a substantially continuous matrix with the foamable material, taking into account the voids formed due to the foaming of the epoxy material. The surface layer material is therefore embedded in this epoxy matrix.

The foam layer is of a rigid epoxy foam. Rigid meaning that it is hard to the touch and resistant to manually applied pressure. It is preferred that the foam layer have a thickness of from 5 to 15 millimeters, preferably from 7 to 13 millimeters and most preferably from 8 to 13 millimeters. In the production of the composite materials of the present invention it is preferred that the foamable material from which the foam is produced have a thickness in the unfoamed state of from 1 to 5 millimeters, preferably 2 to 4 millimeters more preferably 2 to 3.5 millimeters.

The present invention further provides a process for the production of composite materials comprising providing a first layer, laying a layer of heat activatable foamable epoxy material thereon and providing a second surface layer on the surface of the layer of heat activatable foamable epoxy material remote from the first layer and heating to activate the epoxy material to cause it to foam and cure and to thereby form a rigid foamed epoxy material bonded to the surface layers.

In one further embodiment the present invention provides another process for the production of composite materials comprising spraying a foamable epoxy material between two surface layers and allowing the foamable material to expand and cure and bond to the surface layers.

In a preferred embodiment of the processes of the present invention the surface layers are porous preferably of fibrous material. In a further preferred embodiment the surface layers are coated and/or impregnated with an epoxy material prior to heating. Preferably when such an epoxy material is used it is compatible with the heat activatable foamable epoxy material, so as to form a substantially continuous matrix therewith, as hereinbefore described. In this way when the surface layers are porous they can become embedded in the epoxy material. Preferably the epoxy material also cures under the same conditions as the heat activatable foamable epoxy material cures. In this embodiment the heating step of the process of the present invention will cure both epoxy resins. Conveniently the epoxy material with which the porous layers are coated and/or impregnated is the same epoxy material as is used as the basis for the heat activated foamable material although it need not be foamable.

In another preferred embodiment the layers are matching hollow profiles and the foam is created between the profiles. For example the layers may be concentric tubes or matching box sections. In this embodiment the structures may be produced by providing the foamable material between the two matching profiles which are preferably held apart to allow formation of the foam layer of desired thickness. For example the foamable material may be extruded between two moving spaced apart concentric tubes and subsequently foamed to produce the composite of the invention.

The various embodiments of the present invention envisage in addition, sandwich composites containing four or more layers, their production and materials made therefrom. For example in addition to three layer sandwich structures the composite may comprise five layers consisting of two outer layers such as fibrous, metallic or plastic layers and an inner layer of fibrous, metallic or plastic material with two layers of epoxy foam or heat activatable epoxy foam forming material interposed between the layers. Composites containing a greater number of layers are also envisaged providing, however, that the two surface layers of the composite are according to the present invention.

Foamable epoxy materials typically contain an epoxy resin, a blowing agent and a curing agent and frequently also contain a filler. The blowing agent and the curing agent can be selected so that foaming and curing (hardening) occur within the desired temperature range. The materials should therefore be chosen so that the temperature required for foaming and curing does not damage the surface layers. The epoxy resin may be chosen according to the degree of stiffness that is required in the product. Amine curing agents are frequently used in which case curing temperatures of at least 100° C. are generally required. It is preferred that the blowing agent and curing agent be chosen so that foaming starts at a temperature slightly below the curing temperature. The foamable epoxy resin may be applied as a liquid typically through use of a solvent such as an alcohol. In this embodiment the epoxy resin may be sprayed or painted onto one or both of the surface layers. The solvent may then be removed by evaporation to provide a continuous or discontinuous layer of foamable epoxy material. Alternatively the foamable epoxy material may be extruded and cut into pieces for use in the invention or alternatively extruded onto one of the surface layers conveniently between the two surface layers.

The heat activated epoxy foam forming material should be chosen according to the application to which the composite is to be put. However the heat-activated epoxy-based resin should have foamable characteristics upon activation through the use of heat whereby it expands, cross-links to produce hard, rigid foam and cures to bond to the surface layers. An example of a preferred formulation is an epoxy-based material that may include polymer modifiers such as an ethylene copolymer or terpolymer that is commercially available from L & L Products, Inc of Romeo, Mich., under the designations L-5204, L-5206, L-5207, L-5208, L-5209, L-5214 and L-5222 and from Core Products as core 5207, 5214, 5234 and 5231. These products may also include fillers such as glass microspheres, calcium carbonate and talc which can reduce the density of the foam. One advantage of these preferred heat activated foamable materials is that they can be processed in several ways to produce the heat activatable foamable layer of the present invention. The layer of foamable activatable epoxy material may be continuous or discontinuous. Possible techniques for the provision of the layer of foamable activatable material include the provision of sheet material, injection molding, blow molding, thermoforming, direct deposition of palletized materials, extrusion or extrusion with a mini-applicator extruder. The preferred epoxy materials are flexible prior to activation and this flexibility enables the creation of designs that allow the production of complex shapes and which exceed the design flexibility capability of most prior art high strength materials.

The heat activatable foamable epoxy resin whether it be as strips or spots is thermally expandable. That is, upon the application of heat they will expand, typically by a foaming reaction and preferably to at least 130%, more preferably at least 150%, the volume of the unexpanded state, but more preferably to at least twice the volume of the expanded state. The material also cures to provide a rigid epoxy foam bonded to the surface layers. The foamable material is preferably not tacky to the touch at room temperature and it is such that it will soften and then expand due to the activation of the blowing agent, the epoxy will then begin to cure and develop adhesive properties so that it will bond to the surface layers and finally the curing will be completed to harden the foamed epoxy resin. The resulting product being a sandwich structure comprising the surface layers bonded to the hard, rigid epoxy foam.

Epoxy resin preferably forms about 5% to about 75% by weight and more preferably from about 15% to 65% by weight of the activatable foamable epoxy material composition. Filler preferably forms from about 0% to about 70% by weight and more preferably from about 20% to about 50% by weight of the composition. A blowing agent preferably forms from about 0.5% to about 10% by weight and more preferably from about 0.2% to 5% by weight of the composition. A curing agent preferably forms from about 0% to about 10% by weight and more preferably from about 0.5% to 5% by weight of the composition. An accelerator preferably forms from about 0% to about 10% by weight and more preferably from about 0.3% to 5% by weight of the composition. A preferred formulation is set out in the following table.

| Ingredient | % by weight |
| --- | --- |
| Epoxy Resin | 15% to 65% |
| Ethylene Copolymer | 0% to 20% |
| Blowing Agent | 0.2% to 5% |
| Curing Agent | 0.5% to 5 |
| Accelerator | 0.3% to 5% |
| Filler | 20% to 50% |

In the preferred embodiment of the process of the present invention one or more of the surface layers is coated and/or impregnated with an epoxy material prior to heating to foam and cure the heat activatable epoxy material. In this embodiment it is preferred that the epoxy material used to coat and/or impregnate the surface layer cure under the same conditions as those under which the heat activatable foamable material cures. In a particularly preferred embodiment the epoxy material is the same as the epoxy material upon which the heat activated foamable material is based. This embodiment is particularly preferred when the surface layers are porous so that they may be impregnated with epoxy material. Alternatively the impregnation may be accomplished through the application of the foamable epoxy material in liquid form.

Epoxy resins that are preferably used in the foamable material have an epoxy equivalents value of about 200 to 5000, more preferably 300 to 3000, since these resins have suitable curing reactivity and melting points. Therefore, foams having satisfactory rigidity can be prepared. More preferably, the epoxy resin contains about 500 to 2500 and most preferably contains about 500 to 1500 epoxy equivalents.

Epoxy resins having suitable epoxy equivalents are not restricted to a single type of epoxy resin. Rather, combinations of epoxy resins may be used. Representative epoxy resins include, but are not limited to, bisphenol A, bisphenol F, brominated bisphenol A, hydrogenated bisphenol A, bisphenol S, bisphenol AF, biphenyl, naphthalene, fluorine, phenol novolac, ortho-cresone novolac, DPP novolac, tri-functional, tris-hydroxyphenylmethane, tetraphenolethane and other glycidyl ether types are preferred.

The curing agent is material that is capable of curing epoxy resins. Preferably, the curing agent can co-exist at room temperature or usual storage temperatures with the epoxy resin in unexpanded form without reacting with the epoxy resin, while at the same time, maintaining its curing reactivity. The curing agent preferably cures the epoxy resin at a temperature above the melting point of the epoxy resin and accordingly the curing reactivity of the curing agent should not be diminished when the foamable epoxy resin formulation is compounded and/or extruded.

Preferably, the curing agent retains sufficient reactivity during the production and storage of the foamable material in order to cure the epoxy resin when desired. Therefore, while some limited curing of the epoxy resin may occur during the production and storage of the foam precursor material, such curing should not substantially affect the curing reactivity of the curing agent. Accordingly, the curing agent also preferably has low reactivity with the epoxy resin when stored at room or usual storage temperatures in order to allow the foamable material to be stored for a long-term. Preferably, a curing agent is utilized that initiates curing in the temperature range of about 100° C. to 200° C. More preferably, the curing temperature is from about 130° C. to 180° C.

Preferred curing agents include polyaddition type, catalyst type and condensation type curing agents. The polyaddition type curing agents include, but are not limited to, polyamine-based dicyandiamide and the acid anhydride-based methyl nadic acid anhydride. The catalyst type curing agents include, but are not limited to, Imidazole-based 2-methylimidazole, 2-ethyl 4-methylimidazole and 2-heptadecyl imidazole, Lewis acid-based monoethylamine boron trifluoride, piperazine boron trifluoride and other related compounds.

The amount of curing agent used in the foam precursor materials will differ depending on the epoxy equivalents of the epoxy resin and will be sufficient to provide the rigid foam structure. Generally, an amount of curing agent is utilized that will effectively cure the epoxy resin. Preferable amounts are 1 to 25 parts by weight to 100 parts by weight of the epoxy resin and more preferably 1 to 10 parts by weight.

The foaming agent decomposes and expands at a temperature that is higher than the melting point of the epoxy resin that is used and does not decompose during the compounding and production of the foamable material such as during compounding and/or extrusion.

A foaming agent is selected that decomposes, and thus expands the epoxy resin, in a prescribed heating temperature range, depending on the curing agent used. The temperature range in which the curing agent can cure the epoxy resin should preferably overlap the temperature range in which the foaming agent decomposes and expands. Specifically, the foaming (decomposition) temperature is preferably about 100° C. or higher, and more preferably 120° C. or higher.

Preferably, organic decomposing-type foaming agents are utilized. For example, azodicarbonamide, azobisformamide, azobisisobutyronitrile, barium azodicarboxylate, N,N$^1$-dinitrosopentamethylene tetramine, N,N$^1$-dinitroso-N,N1-dimethylteraphthalamide, para-toluensulfonyl hydrazide, benzenesulfonyl hydrazide, 4,4$^1$-oxybenzenesulfonyl hydrazide and other related compounds may be used. Any one or a combination of two or more of these foaming agents may be used. Azodicarbonamide is particularly preferred.

The foaming agent is preferably added in an amount to provide a foaming ratio of about 30% to 100%, preferably 50% to 400%, and more preferably about 100% to 300%. That is, the amount of foaming agent utilised will produce a foam material having a volume 1.3 to 10 times larger than the volume of the foam precursor material, preferably 1.5 to 5 times larger and more preferably about 2 to 4 times larger. While specific amounts will depend upon the particular epoxy resin that is selected, the foaming agent may be added at about 0.5 to 15 parts by weight to 100 parts by weight of the epoxy resin and more preferably 0.5 to 10 parts by weight.

Various other additives may be added to the foamable composition, such as other resin components including for example, thermosetting resins and/or thermoplastic resins, inorganic additives including, for example, calcium carbonate, talc or mica, reactive dilutive compositions, curing accelerators, foaming aids, flame retardants, coloring agents and reinforcing materials (in powder form, chip form, fibre form bead form, etc) including, for example, glass, metal, ceramic or similar materials.

A thermosetting resin, other than an epoxy resin, may be added, including for example, polyester resins, melamine resins, urea resins and phenol resins. If such thermosetting resins are used, the amount of thermosetting resin can be appropriately determined based upon on the curing agent. If a thermoplastic resin is added, the resulting foam is generally more resilient than when a thermosetting resin alone is used. Thus, by changing the amount of thermoplastic resins and thermosetting resins that are included in the foam precursor material, foam materials having different qualities may be produced. For example, adding such additives can increase the toughness of the foam material.

If a thermoplastic resin is added as an additive, the resin component is preferably polyethylene, polyvinyl acetate or a copolymer of ethylene and an alkyl acrylate. The copolymers of ethylene and alkyl acrylates can include ethylene-methyl acrtylate polymer, ethylene-ethyl acrylate polymer, ethylene-butyl acrylate polymer etc, and preferred copolymers are of ethylene and alkyl acrylates with about 1 to 4 carbon atoms in the alkyl group. The thermoplastic resin may be a single compound or composition of matter or a combination of two or more compounds or compositions of matter.

If a thermoplastic resin is added, a polymerizable monomer may also be added. Suitable polymerizable monomers include triallyl cyanurate triallyl isocryanurate, trimethylolpropane trimethacrylate and similar compounds.

By adding a reinforcing material (in powder form, chip form, fibre form, bead form etc) such as glass, metal or ceramic, the rigidity of the resulting foam material can be increased. Specifically, if a fibre-formed material is added, the resiliency of the resulting foam material can be increased. The amount of such reinforcing materials to be added is preferably 1 to 300 parts by weight to 100 parts by weight of the resin component and more preferably 1 to 100 parts by weight.

In the embodiment of the invention where the surface layers are fibrous layers, which are preferably carbon fibre or glass fibre layers as previously described and are coated and/or impregnated with an epoxy material comprising epoxy resin preferably from about 5% to about 75% by weight and more preferably from about 15% to 65% by weight of the composition. Filler preferably forms from about 0% to about 70% by weight and more preferably from about 20% to about 50% by weight of the composition. Curing agent preferably forms from about 0% to about 10% by weight and more preferably from about 0.5% to 5% by weight of the composition. Accelerator preferably forms from about 0% to about 10% by weight and more preferably from about 0.3% to 5% by weight of the composition. A preferred coating formulation is set out in the following table.

| Ingredient | % by weight |
| --- | --- |
| Epoxy Resin | 15% to 65% |
| Ethylene Copolymer | 0% to 20% |
| Curing Agent | 0.5% to 5 |
| Accelerator | 0.3% to 5% |
| Filler | 20% to 50% |

The composites of the present invention may be of any required shape and may conveniently be formed in a mould designed to provide the required shape. In certain embodiments the surface layers and the heat activatable foamable material (prior to foaming) are generally flexible materials. Accordingly the composites may be produced by laying down the first surface layer in the mold, optionally coating and/or impregnating said first layer with an epoxy material, then providing a layer of the heat activatable foamable epoxy material against the first surface layer, providing a second surface layer against the layer of heat activatable material. This second layer may optionally be precoated and/or impregnated with an epoxy material or, optionally, coated and/or impregnated after it is provided against the layer of heat activatable material. The mold may then be closed and heated to the temperature required to cause the heat activatable foamable epoxy material to foam and cure and to cause any epoxy material used to coat and/or impregnate the surface layers to cure. Where composites having more than three layers are to be produced additional layers may be provided prior to closing the mould and heating to cause foaming and curing. The additional layers may be of any suitable material such as continuous sheet or fibrous layers.

Alternatively the surface layers may be rigid such as matching box structures or concentric tubes and in this embodiment the foamable epoxy material may be provided between the matching structures or tubes which are held apart by suitable means to allow the desired expansion of the foamable material. In a preferred embodiment the box structures or tubes are metallic.

The temperatures that should be used for the heating to foam and cure the epoxy materials will depend upon the choice of blowing agent and curing agent however, we have found that temperatures in the region of 100° C. to 240° C. are particularly useful although epoxy resin systems that foam upon mixing the components at lower temperatures are known. Alternatively one can use a system which foams at lower temperatures, such as those in which two or more components are provided and mixed at ambient temperature. A benefit of the process of the present invention is that external pressure may not be required during moulding in order to achieve a desired surface finish in that the foaming of the heat activatable foamable epoxy resin can itself produced sufficient internal pressure.

Following the molding process the mold may be opened and the desired composite obtained. If necessary the mold surface may be provided with release lining material to ensure the composite does not adhere to the mold.

We have found that composites of the present invention have high flexural strength combined with low weight. Typically a composite having a thickness of from 5 millimeters to 8 millimeters has a flexural strength of from 100 mPa to 700 mPa typically 300 mPa to 700 mPa at a density of from 0.1 to 1.0 grams/cc which compares favorably with current light weight aluminium, based materials of similar weight per unit area which have a flexural modulus of about 10% that of the composite of the present invention products of comparable weight per unit area. We have also found that the composites of the present invention can sustain considerably greater maximum load than current steel box structures or tubular structures; the composites are also light weight particularly if they are aluminium based. They therefore offer a strong system with considerable weight saving.

In addition we have found that a composite of the present invention has a considerably greater elasticity range under load than comparable steel and aluminium based materials. The improved elasticity being demonstrated by an extension of the elastic area under increasing bad in a standard three point bend test.

The composites of the present invention find a wide range of uses where high strength and light weight are required. For example they may be used in the construction industry, in transportation industries including the automobile, aircraft, aerospace and shipping vessel industries. The composite may be used in applications where box sections or tubes are used to provide strength and/or reinforcement. For example they have found use in aircraft and in particular light weight unmanned surveillance aircraft where they can provide a light weight tubular structure and can also provide strong, light weight panels for supporting equipment. Other applications include reinforcement in vehicles such as door reinforcement against vehicle front and side crash where the composites may be used in applications which currently employ steel structures to provide increased strength at reduced weight. It is clear that similar benefits may be accomplished in a multitude of applications where the combination of strength and light weight are required. Furthermore they may be used in the production of sporting goods such as skis, roller skates, roller blades and the like.

The composites may also be used as components in buildings, vehicles, sporting goods and furniture.

If the composites are to be attached to other components within the finished article attachment means may be provided within the composite to enable assembly. In this embodiment of the invention the attachment may be located within the activatable foamable material prior to heating to foam and cure. In this way the foamable material can expand around the attachment to hold it firmly in place as the epoxy material cures. Typical attachment means comprise clips, studs, bolts and the like which may be of any material providing they retain their strength under the conditions used for activation and foaming.

The present invention is further illustrated by reference to the following Examples.

EXAMPLE 1

An extruded foamable epoxy material available from Core Products as CORE-5234 is placed between two layers of a woven carbon fibre matt of weight 245 grams/m$^2$, impregnated with the same epoxy resins as was used for the foamable materials. The three layers are then placed in a mould and cured at 175° C. for 45 minutes and at normal pressure to form a composite 5.4 millimeters thick.

EXAMPLE 2

The process of example 1 is repeated, except the fibre roving is not impregnated with a separate epoxy resin but with the foamable material itself which has been modified to be liquid with a methanol solvent.

The difference is that this composite sandwich (embedded fibre rowing+foambale material+embedded fibre) is now dry to touch and can be easily handled.

Figure 5:
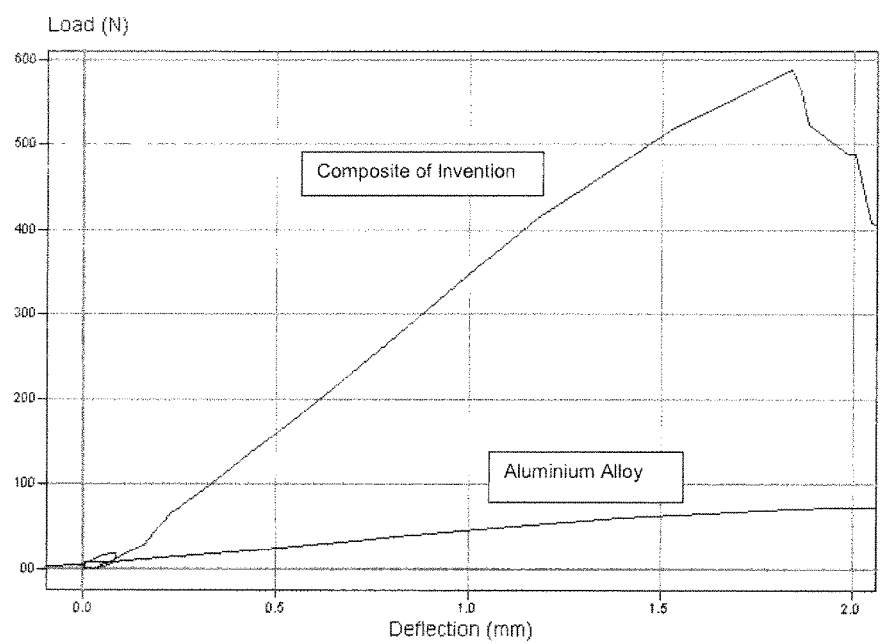
FIG. 5 is a graph which compares the performance of the material of the present invention with that of a current high strength aluminium alloy.

FIG. 5 compares the flexural modulus according to ASTM D790/ISO 178 of a sample of the composite produced in Example 1 with a sample of traditional high strength aluminium of thickness 1.25 mm and of similar weight per unit area. The composite of the present invention had a density of 0.5 grams/cc whereas the density of the aluminium layer is 2.7 grams/cc. The composite of the present invention weighed 6.955 grams/sq meter whereas the aluminium sample weighed 7.13 grams/sq meter. FIG. 5 shows that the composite of the invention had a flexural modulus of 360 mPa as compared with a modulus of 31.5 mPa for the aluminium sample. FIG. 5 also shows that the maximum load that can be sustained by the composite of the invention is 590 Newtons whereas that for the aluminium sample is 100 Newtons.

Figure 6:
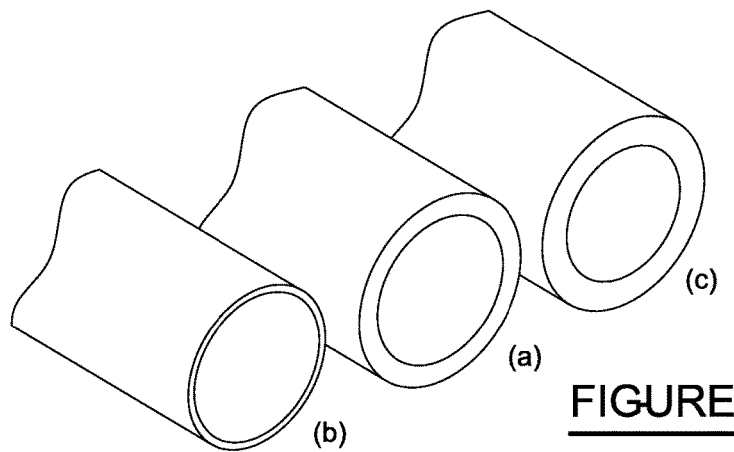
FIG. 6 shows three tubes according to the present teachings.

The invention is further illustrated by the accompanying FIG. 6 which shows three tubes.

a) A steel tube of 35 millimeters external diameter and of steel thickness 1.5 millimeters of weight 1133 grams per meter and density 7.2 grams/cc.

b) An aluminium tube of 35 millimeters external diameter and of aluminium thickness 1.5 millimeters of weight 425 grams per meter and density 2.7 grams/cc.

c) A composite tube according to the present invention of weight 837 grams per meter and density 1.6 grams/cc consisting of an outer aluminium tube of 35 millimeters external diameter and of aluminium thickness 1.5 millimeters, an inner aluminium tube of 25 millimeters external diameter and of aluminium thickness 1 millimeter. A layer of rigid epoxy foam of thickness 4.25 millimeters is contained between the concentric aluminium tubes, the foam density is 0.66 grams/cc.

The product of the invention was prepared by extruding a foamable epoxy resin composition from a formulation available from Core Products as Core 5207 to provide a strip of foamable material 3 miilimeters thick. The strip was then out and applied manually around the internal aluminium tube. The outer tube was then provided around the foam strip with plugs provided at both ends to define and maintain a gap between the foamable material and the inner surface of the outer tube. The structure was then heated at 170° C. for 30 minutes to cause the foamable material to expand and adhere to both metal tubes to produce the structure shown in (c) of FIG. 6.

Figure 7:
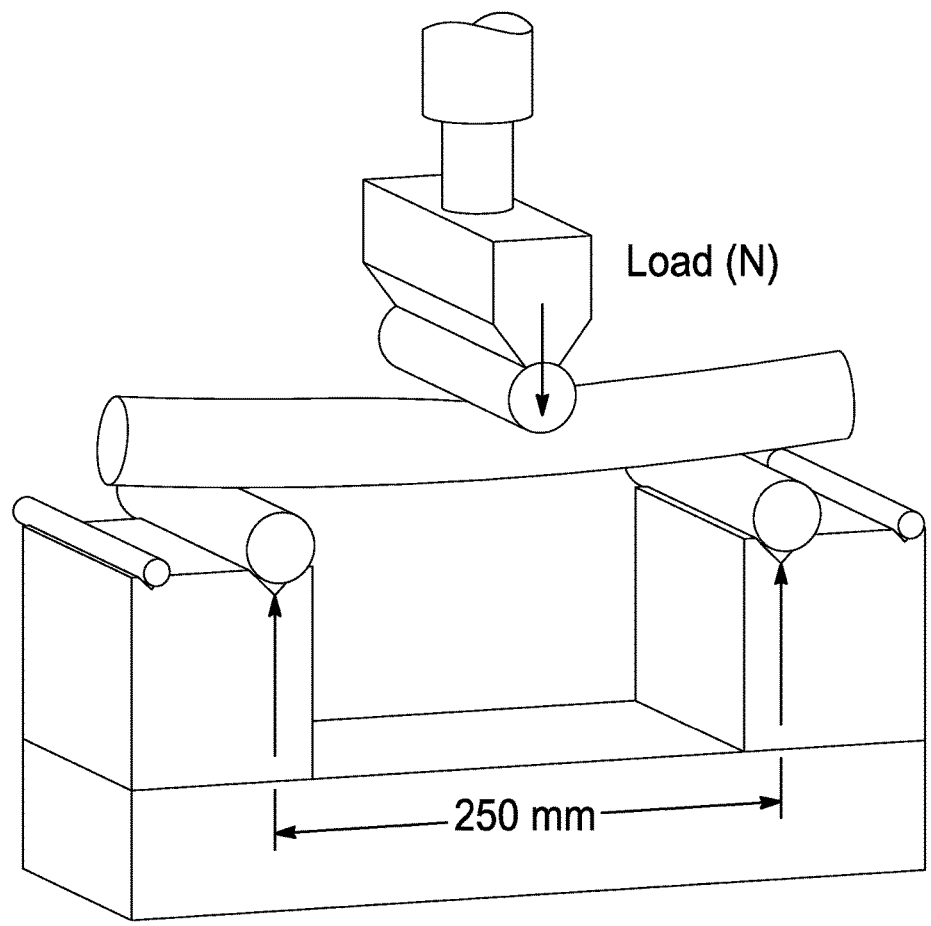
FIG. 7 shows a tube being subjected to a bending test.
Figure 8:
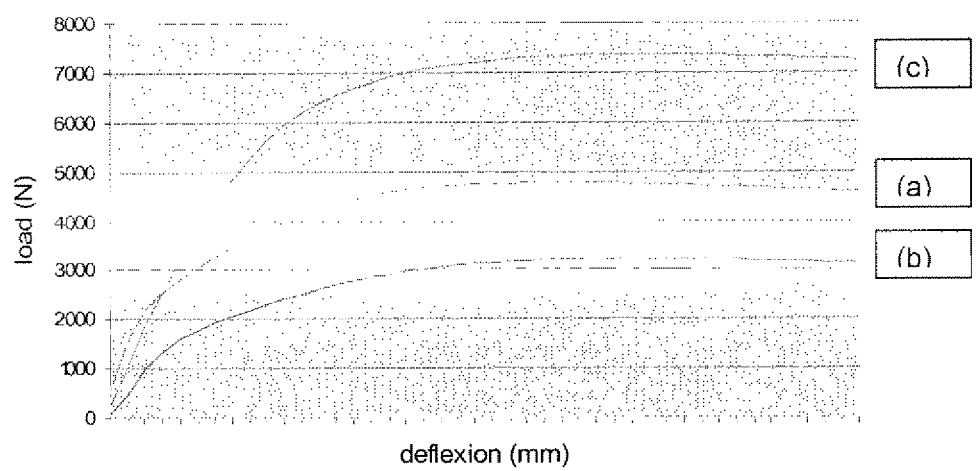
FIG. 8 shows a graph comparing the composite of the present teachings versus an aluminium tube and a steel tube.

The tubes were subjected to a bending test using a three point bending test machine as shown in FIG. 7 and the results of the tests are shown in FIG. 8. The applied speed for the bending test was 20 mm/min.

FIG. 8 shows that the composite of the invention had a greater elastic range (to 5000N) as compared with the steel tube (to about 3250N) and the aluminium tube (to about 1250N). Furthermore the strength of the composite was considerably greater than both the steel and the aluminium tubes with a resistance to about 7250N for the composition as compared with about 4750N for the steel tube and about 3250N for the aluminium tube. The results clearly show the improvement in strength obtained with the composite of the invention and with a significant reduction in weight.

The invention claimed is:

1. A composite comprising a sandwich structure comprising at least two surface layers, wherein the at least two surface layers are porous, fibrous, or both, and attached to a central layer of activatable epoxy foam; wherein, upon activation of the activatable epoxy foam, a layer of expanded epoxy foam is at least 1.5 times a combined thickness of the at least two surface layers and the expanded epoxy foam has a density of from 0.2 to 1.5 gram/cc; and
   wherein at least one surface layer is formed from a carbon fiber material, a metallic woven material, or combinations thereof.

2. A method comprising:
   locating the composite of claim 1 into a mold prior to activation of the activatable epoxy foam, the activatable epoxy foam being amenable to plastic deformation and pliable enough to take on general contours and shape of the mold prior to activation of the activatable epoxy foam;
   simultaneously activating and shaping the activatable epoxy foam into a foam core defined by the mold wherein the activatable epoxy foam conforms to the shape of the mold due to a force of expansion of the activatable epoxy foam during the activation;
   wherein the shaping step is substantially free of any compressive force.

3. The method of claim 2, including bonding the at least two surface layers to the foam core.

4. The method of claim 3, wherein the bonding occurs substantially simultaneously with the activating and shaping step.

5. The method of claim 2, including locating an adhesive layer onto one or more of a first surface or a opposing second surface of the foam core.

6. The method of claim 2, including forming a second foam core in direct or indirect planar contact with the foam core.

7. The method of claim 6, including forming a third foam core in direct or indirect planar contact with one or more of the foam core and the second foam core.

8. The method of claim 6, including bonding one of the surface layers in between the foam core and the second foam core.

9. The method of claim 7, including bonding the two surface layers to one or more of the foam core and the second foam core.

10. The method of claim 2, including forming at least one of the at least two surface layers from a material selected from fibrous materials, metallic materials, polymeric materials, or combinations thereof.

11. The method of claim 2, including forming at least one of the at least two surface layers from a honeycomb material, a pre-preg material, or combinations thereof.

12. The method of claim 2, including forming at least one of the at least two surface layers from aluminum, steel, or combinations thereof.

13. The method of claim 2, including forming at least one of the at least two surface layers from a woven fiber, a non-woven fiber, a lapped fiber, or combinations thereof.

14. The method of claim 2, wherein the activation step occurs by way of a heat cure, moisture cure, room temperature cure, induction cure, ultra-violet cure, or any combination thereof.

15. The method of claim 2, wherein the method results in formation of a foam core having a non-planar geometry.

16. The method of claim 2, wherein after activation the activatable epoxy foam is not amenable to plastic deformation.

17. The method of claim 2, wherein prior to activation the activatable epoxy foam is a flexible solid and after activation the activatable epoxy foam is an inflexible solid.

18. A composite according to claim 1, in which the composite is part of a transportation vehicle.

19. A composite according to claim 18, wherein the composite provides reinforcement in a transportation vehicle against a crash.

20. A composite according to claim 19, wherein the composite provides reinforcement to an automobile door.

\* \* \* \* \*